July 8, 1958  T. H. EINING  2,841,912
AUTOMATIC FISHING DEVICE
Filed Aug. 20, 1957
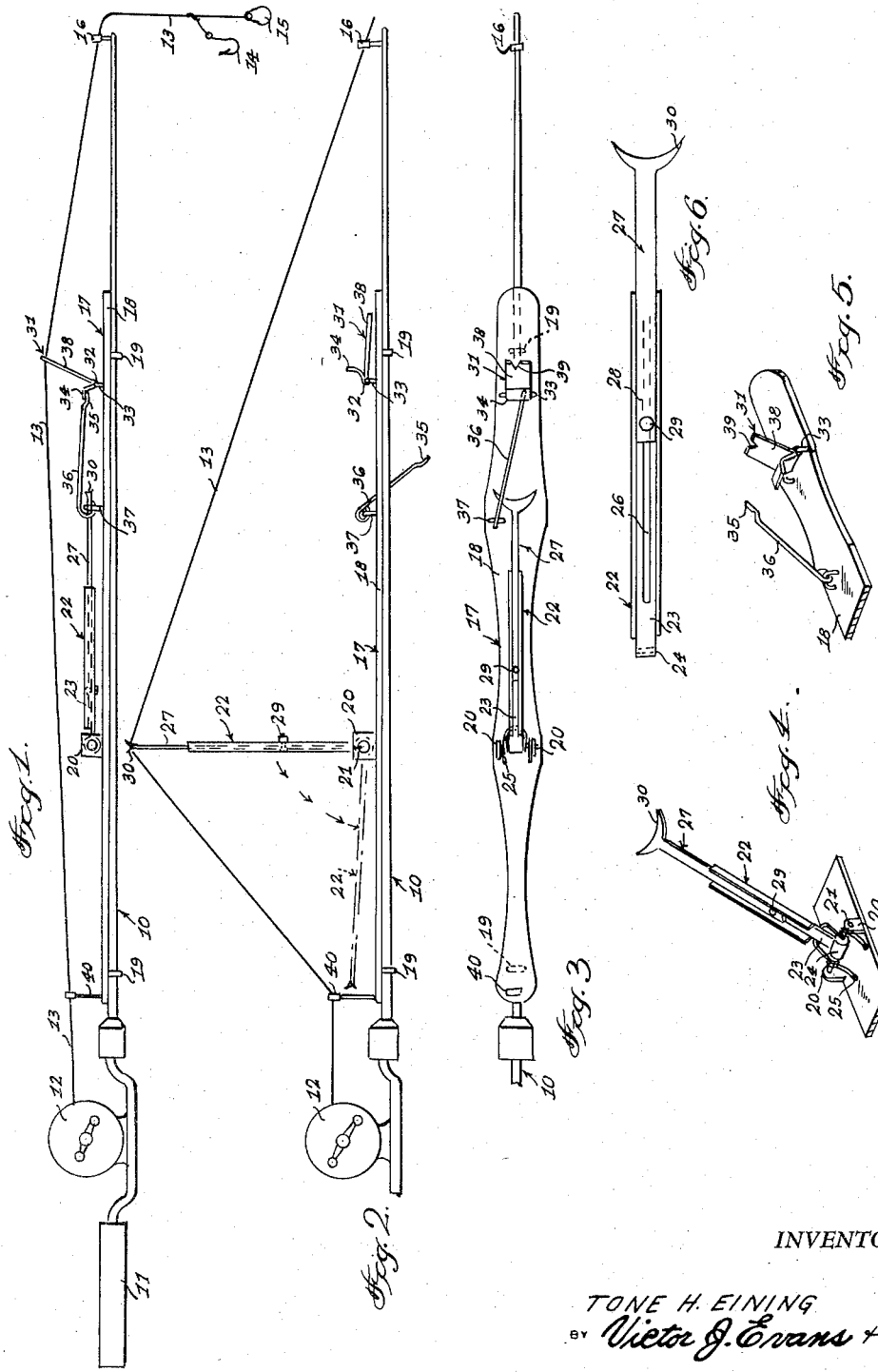
INVENTOR.
TONE H. EINING
BY *Victor J. Evans & Co.*
ATTORNEYS

# United States Patent Office 2,841,912
Patented July 8, 1958

2,841,912

AUTOMATIC FISHING DEVICE

Tone H. Eining, Colorado Springs, Colo.

Application August 20, 1957, Serial No. 679,298

2 Claims. (Cl. 43—15)

This invention relates to fishing equipment, and more particularly to an automatic fishing device for moving a fishing line and hook automatically when a fish strikes the hook.

The object of the invention is to provide an automatic fishing device which is adapted to be releasably connected to a conventional fishing rod so that when a fish strikes the hook, the line will be automatically jerked or pulled whereby the fish will be automatically snagged or hooked so that the fish can then be retrieved or pulled in.

Another object of the invention is to provide an automatic fishing device which is adapted to be clamped to a fishing rod and wherein the user can set the device so that the fishing line can be actuated without requiring the user to hold the rod in his hand and wherein after a fish strikes the line the device will be automatically actuated to snag or hook the fish so that the user can readily pick up the rod, and reel in the line whereby the fish which has been automatically hooked can be retrieved.

A further object of the invention is to provide an automatic fishing device which is extremely simple and inexpensive to manufacture.

Other objects and advantages will be apparent during the course of the following description.

In the accompanying drawings, forming a part of this application and in which like numerals are used to designate like parts throughout the same.

Figure 1 is a side elevational view showing the automatic fishing device of the present invention mounted on a fishing rod, and showing the parts in set position.

Figure 2 is a view similar to Figure 1, but showing the position of the parts after a fish strikes the hook and actuates the device.

Figure 3 is a top plan view of the assembly, and with the parts in the position corresponding to Figure 1.

Figure 4 is a fragmentary perspective view illustrating the adjustable trip bar.

Figure 5 is a fragmentary perspective view illustrating the keeper and latch.

Figure 6 is a plan view of the adjustable trip bar.

Referring in detail to the drawings, the numeral 10 indicates a conventional fishing rod which includes the usual handle 11 and reel 12, and the reel 12 has a fishing line 13 trained thereover, Figure 1. The line 13 is adapted to have a hook such as the hook 14 connected thereto, and the numeral 15 indicates the bait which may be of any desired or suitable type or construction. The front end of the rod 10 is provided with the usual eyelet or guide member 16.

The present invention is directed to an automatic fishing device which is indicated generally by the numeral 17, and the device 17 is constructed so that when a fish strikes the hook 14, and with the parts in the set position of Figure 1, the line will be automatically actuated so that the parts will move from the position shown in Figures 1 and 3 to the position shown in Figure 2 whereby the fish will be automatically snagged on the hook 14 so that the reel 12 can be actuated in the usual manner to retrieve or pull in the fish. The device 17 includes a base 18 which is arranged contiguous to the rod 10, and the base 18 is connected to the rod 10 through the medium of clamps 19.

As shown in Figure 4 for example, extending upwardly from the base 18 is a pair of spaced parallel ears or lugs 20 which have a pin 21 extending therethrough. The numeral 22 indicates an adjustable trip bar which includes an arm 23 that has a sleeve 24 that is rotatably mounted on the pin 21. A spring member 25 is mounted on the pin 21, and the spring member 25 engages the trip bar 22 for normally urging or biasing the parts from the position shown in Figures 1 and 3 to the position shown in Figure 2. The arm 23 is provided with a slot 26, and the trip bar 22 further includes a lever 27 which includes a portion 28 that has a securing element such as a set screw or bolt 29 extending therethrough, and the securing element 29 is adapted to engage the slot 26 in the arm 23. Thus, by loosening the securing element 29, the lever 27 can be adjusted with respect to the arm 23 so that the effective length of the trip bar 22 can be varied as desired. A curved bracket 30 is arranged on the outer end of the lever 27 for a purpose to be later described.

The automatic fishing device of the present invention further includes a keeper which is indicated generally by the numeral 31, and the keeper 31 includes a collar 32 which is pivotally or movably mounted on a support member 33 that is anchored to the base 18. The keeper 31 includes a finger 34 which is adapted to coact with or engage an offset end portion 35 of a movable latch 36. The other end of the latch 36 is anchored to the base 18 as at 37. As shown in Figure 5 the keeper 31 further includes a plate portion 38 which is provided with a V-shaped slot or groove 39 through which extends the fishing line 13. Extending upwardly from an end of the base 18 adjacent the reel 12 is a guide member 40, and the fishing line 13 extends through the upper end of the guide member 40.

From the foregoing, it is apparent that there has been provided an automatic fishing device, and in use the parts are adapted to be arranged in the position shown in Figures 1 or 3 when the apparatus is being used. In other words, it will be seen that when the device is set, the keeper 31 is arranged so that its finger 34 engages the offset end portion 35 of the latch 36, and since the latch 36 extends across the upper portion of the bracket 30, it will be seen that the trip bar 22 will be maintained in a down position adjacent the base 18 against the tension of the spring member 25. The parts will remain in the positions shown in Figures 1 and 3 until a fish strikes the hook 14 in an attempt to take the bait 15, and when the fish strikes the hook 14, the tension on the line 13 will move or pivot the keeper 31 in a clockwise direction from the position shown in Figure 1 to the position shown in Figure 2 and this clockwise movement of the keeper 31 on the support member 33 has the effect of freeing the finger 34 from the offset portion 35 of the latch 36. With the finger 34 out of the path of the end of the latch 36, it will be seen that the pressure of the spring member 25 can pivot the trip bar 22 upwardly in a counterclockwise direction about the pivot pin 21 and this will cause the curved bracket 30 to move upwardly to the position shown in Figure 2, and as the bracket 30 is moved upwardly, it engages the line 13 to move the line 13 upwardly as shown in Figure 2 and this has the practical effect of pulling up on the hook 14 so that the fish will be snagged or hooked. The spring member 25 can then move the trip bar 22 from the solid line position shown in Figure 2 to the broken line position shown in Figure 2 so that the reel 12 can then be actuated in the usual manner to draw in the fishing line 13 whereby the fish on the hook 14 can be retrieved.

The fishing line 13 extends through the guide member 40 on the end of the base 18, and the fishing line 13 also extends through the guide member 16 on the outer end of the fishing rod 10. After the fish has been removed from the hook, the parts can again be reset or returned to the position shown in Figures 1 and 3 from the position shown in Figure 2 so that the device is ready to be used again in the same manner.

The parts can be made of any suitable material and in different shapes or sizes. After the device has been tripped, it is independent of the reel, rod, and line. As previously described, the trip bar 22 is adjustable. When the fish tightens the line by engaging the hook, the line is pulled on, and this releases the trip bar 22 to thereby set the hook. The bar 22 is adjustable to the desired amount of kickback. For example when the trip bar is set at a position so that it is five inches long, it will have a kickback at the hook of two inches or more. The guide member 14 serves to hold the line in position when different types of reels are used. The base may be constructed of a suitable light weight material. The device can be used on different types of reels for still fishing and can be fished with as loose a line as desired. When the device is set it will work best when the reel is in retrieved position with the clicker on, which will make the reel stationary enough to work the trip when the fish tightens the line and yet will enable the reel to spin enough so that the hook will not be torn from the fish.

I claim:

1. In an automatic fishing device, in combination with a fishing rod including a reel having a line trained thereover, said device comprising a base arranged contiguous to said rod, clamps connecting said base to said rod, a guide member on said base adjacent said reel for the projection therethrough of the fishing line, a pair of ears extending upwardly from said base, a pin extending between said ears, an adjustable trip bar including an arm provided with a sleeve pivotally mounted on said pin, a spring member mounted on said pin and engaging said arm and normally urging the arm to swing rearwardly toward the reel, there being an elongated slot in said arm, a lever having a free end and including a portion adjustably connected to said arm, a securing element extending through a portion of said lever and engaging said slot, a curved bracket on said free end of said lever and adapted to engage the line, a latch adapted to extend over said bracket and said latch having one end thereof pivotally connected to said base, there being an offset portion in the other end of said latch, a keeper including a collar pivotally connected to said base, and a finger extending from said collar for engagement with the offset portion of said latch, said keeper further including a plate provided with a V-shaped groove for engagement by the fishing line, whereby a pull on the outer end of the line will cause the keeper to release the latch and permit rearward swinging of the trip bar and the curved bracket to engage and jerk the line.

2. In an automatic fishing device for a fishing line, a base, a guide member on said base adjacent one end thereof, ears extending upwardly from said base, a pin extending between said ears, an adjustable trip bar including an arm provided with a sleeve pivotally mounted on said pin, a spring member mounted on said pin and engaging said arm and normally urging the arm to swing rearwardly toward said guide member, there being an elongated slot in said arm, a lever having a free end and a portion adjustably connected to said arm, a securing element extending through a portion of said lever and engaging said slot, a curved bracket on said free end of said lever, a latch adapted to extend over said bracket and said latch having one end thereof pivotally connected to said base, there being an offset portion on the other end of said latch, a keeper including a collar pivotally connected to said base, and a finger extending from said collar for engagement with the offset portion of said latch, said keeper further including a plate provided with a groove for a fishing line, whereby a pull on the outer end of the line will cause the keeper to release the latch and permit rearward swinging of the trip bar and the curved bracket to engage and jerk the line.

References Cited in the file of this patent

UNITED STATES PATENTS

| | | |
|---|---|---|
| 693,071 | Ruud | Feb. 11, 1902 |
| 834,414 | Schmidt | Oct. 3, 1906 |
| 1,742,550 | Mann | Jan. 7, 1930 |
| 1,996,704 | Hawkinson | Apr. 2, 1935 |
| 2,295,250 | Zenewich | Sept. 8, 1942 |
| 2,658,299 | Maxfield | Nov. 10, 1953 |

FOREIGN PATENTS

| | | |
|---|---|---|
| 84,608 | Sweden | Oct. 15, 1935 |